(12) United States Patent
Ratner et al.

(10) Patent No.: US 9,168,994 B2
(45) Date of Patent: Oct. 27, 2015

(54) CUTTER RAIL GUIDE, BLOCK, ARMATURE, AND BLADE

(71) Applicant: Google Inc., Mountain View, CA (US)

(72) Inventors: Daniel Ratner, San Francisco, CA (US); Kyle Brookes, Redwood City, CA (US)

(73) Assignee: Google Inc., Mountain View, CA (US)

( * ) Notice: Subject to any disclaimer, the term of this patent is extended or adjusted under 35 U.S.C. 154(b) by 95 days.

(21) Appl. No.: 14/144,501

(22) Filed: Dec. 30, 2013

(65) Prior Publication Data

US 2015/0266560 A1    Sep. 24, 2015

(51) Int. Cl.
*B64B 1/46* (2006.01)

(52) U.S. Cl.
CPC .......................... *B64B 1/46* (2013.01)

(58) Field of Classification Search
CPC .............. B64B 1/02; B64B 1/40; B64B 1/58; B64B 1/04; B64B 1/46
USPC .............................................. 30/310; 83/592
See application file for complete search history.

(56) References Cited

U.S. PATENT DOCUMENTS

| | | | |
|---|---|---|---|
| 2,931,597 A | 4/1960 | Moore, Jr. | |
| 3,451,649 A | 6/1969 | Weiss et al. | |
| 4,033,527 A | 7/1977 | Parsons | |
| 4,174,082 A | 11/1979 | Eshoo | |
| 4,215,834 A | 8/1980 | Dunlap | |
| 4,262,864 A | 4/1981 | Eshoo | |
| 4,361,297 A | 11/1982 | Pommereau et al. | |
| 4,651,956 A | 3/1987 | Winker et al. | |
| 5,653,405 A * | 8/1997 | Cameron | ........................ 244/99 |
| 6,540,178 B1 | 4/2003 | Hillsdon | |
| 7,567,779 B2 | 7/2009 | Seligsohn et al. | |
| 7,568,656 B2 | 8/2009 | Handley | |
| 2008/0272233 A1 | 11/2008 | Marlin | |
| 2009/0294576 A1 | 12/2009 | LaForge | |
| 2011/0297784 A1* | 12/2011 | Huens | ............................. 244/31 |
| 2013/0175387 A1 | 7/2013 | DeVaul et al. | |
| 2013/0231106 A1 | 9/2013 | Knoblach et al. | |

OTHER PUBLICATIONS

International Searching Authority, International Search Report and Written Opinion for PCT/US2013/020525 mailed Apr. 22, 2013, 16 pages.
International Searching Authority, International Search Report and Written Opinion for PCT/US2014/068990 mailed Mar. 23, 2015, 9 pages.

* cited by examiner

*Primary Examiner* — Tien Dinh
*Assistant Examiner* — Aaron Rodziwicz
(74) *Attorney, Agent, or Firm* — McDonnell Boehnen Hulbert & Berghoff LLP.

(57) ABSTRACT

An apparatus including a balloon envelope, a cutting blade secured to a blade block; a cutter guide rail secured above the balloon envelope, and an arm rotatable about a pivot point having an end secured to the blade block, wherein the end of the arm extends past the blade block, wherein the arm is releasably secured by a release member, and wherein release of the arm from the release member allows for a rotation of the arm, wherein the rotation of the end of the arm is guided by the cutter guide rail such that the cutting blade maintains contact with and cuts the balloon envelope during the rotation of the arm.

17 Claims, 11 Drawing Sheets

US 9,168,994 B2

CUTTER RAIL GUIDE, BLOCK, ARMATURE, AND BLADE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, a balloon flight termination apparatus is provided that includes a rotatable arm that is positioned on a balloon envelope. A cutting blade is secured to the rotatable arm. An end of the arm extends beneath a cutter guide rail that is secured above the balloon envelope. Upon release, the arm is allowed to rotate. The cutter guide rail forces the end of the arm downwards as it rotates so that attached cutting blade is forced into contact with a portion of the balloon and cuts an arc of a circular cutting path into the balloon envelope forming a hole through which the lift gas within the balloon envelope is vented.

In one aspect, an apparatus is provided including a balloon envelope, a cutting blade secured to a blade block, a cutter guide rail secured above the balloon envelope, and an arm rotatable about a pivot point, the arm having an end secured to the blade block, wherein the end of the arm extends past the blade block, wherein the arm is releasably secured by a release member, and wherein release of the arm from the release member allows for a rotation of the arm, wherein the rotation of the end of the arm is guided by the cutter guide rail such that the cutting blade maintains contact with and cuts the balloon envelope during the rotation of the arm.

In another aspect, a method of venting lift gas from a balloon envelope is provided including the steps of providing a balloon envelope, a cutting blade secured to a blade block, a cutter guide rail secured above the balloon envelope, and an arm rotatable about a pivot point, the arm having an end secured to the blade block, wherein the end of the arm extends past the blade block, wherein the arm is releasably secured by a release member, receiving a signal to release the arm from the release member, releasing the arm from the release member, rotating the arm, and guiding the end of the arm with the cutter guide rail such that the cutting blade maintains contact with and cuts the balloon envelope during the rotation of the arm.

These as well as other aspects, advantages, and alternatives, will become apparent to those of ordinary skill in the art by reading the following detailed description, with reference where appropriate to the accompanying drawings.

DETAILED DESCRIPTION

Figure 1:
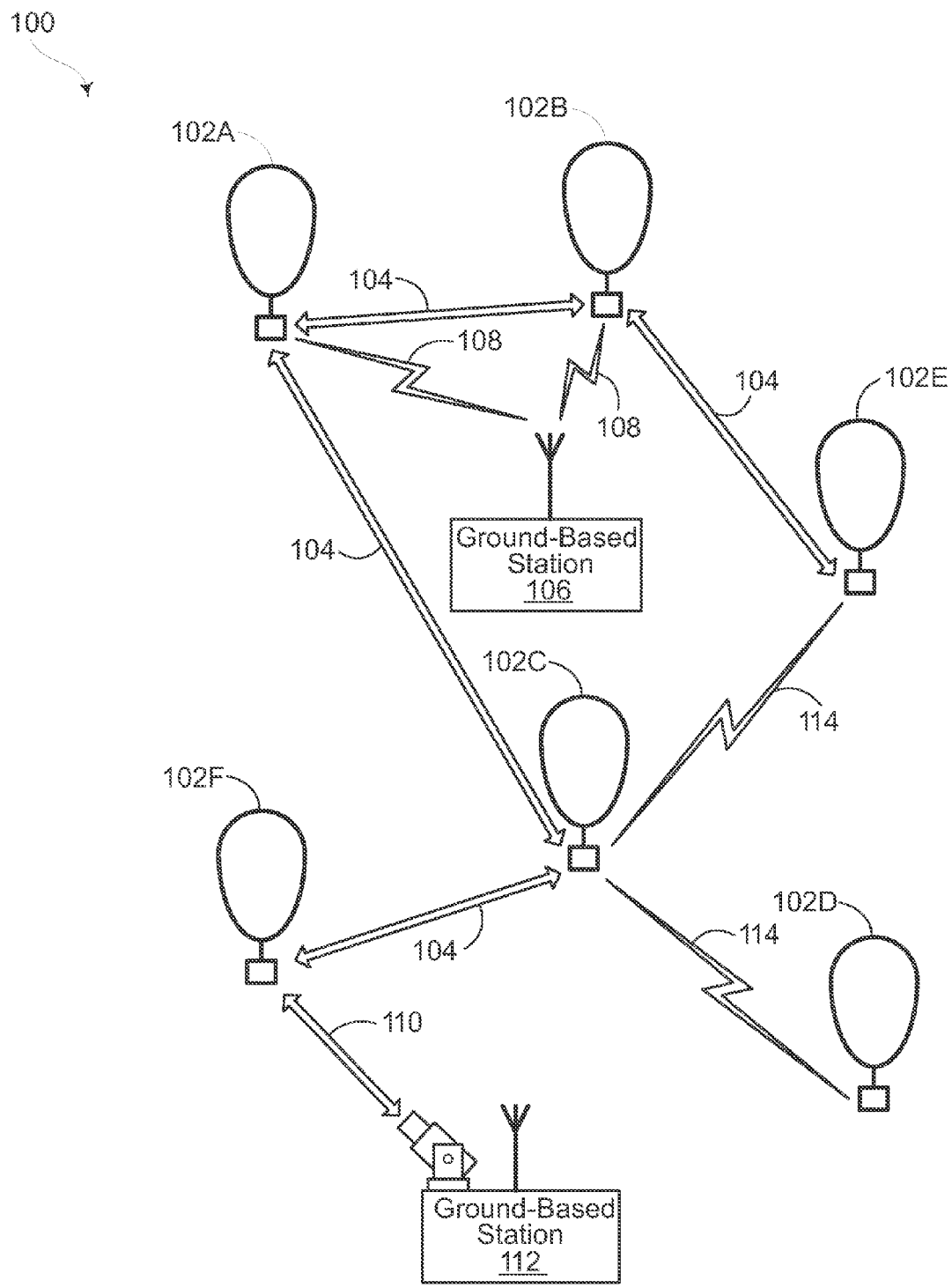
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

Exemplary embodiments may be implemented in association with a data network that includes a plurality of balloons. In an exemplary embodiment, the balloon envelope is filled with a pressurized lifting gas, such as helium or hydrogen, to provide buoyancy to the balloon and to maintain the balloon envelope aloft.

Instruments and electronic equipment may be positioned within a payload secured beneath the balloon envelope that may be used for communication, or to record various data and information. After a period of time, it may be desirable to have the payload return to the surface of the earth to retrieve and/or replace the instruments and electronic devices positioned in the payload. There may be other, perhaps more important, reasons to bring the payload down to the earth's surface. For example, the balloon payload may be brought down to provide necessary upgrades to the electronic equipment within the payload. Or, the payload may be brought down to prevent the payload from entering into unauthorized air space.

To allow the envelope and payload to descend to the surface of the earth, the lift gas within the envelope may be vented or released to the atmosphere. For this reason the balloon may be provided with a flight termination system (FTS). For example, the FTS may include a cutting blade that may be mechanically manipulated to cut a hole in the balloon envelope, allowing lift gas to escape from the balloon envelope through the hole. In this manner, the FTS may be used to vent the lift gas from the balloon envelope to allow the payload and balloon envelope to descend to the earth.

In embodiments where the flight termination system is configured to cut a hole in the balloon envelope in order to vent lift gas, it is desirable to have a reliable means of cutting the hole in the balloon envelope. If a hole is not properly cut into the balloon envelope, a number of problems may arise. For example, the balloon envelope and payload may stay aloft and fail to return to earth at the desired time or location, the balloon and payload may drift into controlled or unauthorized air space resulting in the payload and its contents becoming lost, or the balloon envelope and payload may return to earth at a location where it is difficult or impossible to retrieve, such as over the ocean or in mountainous terrain.

The present embodiments provide a reliable mechanism for insuring that a hole is properly cut into the balloon envelope, such that proper venting of lift gas occurs, and such that the balloon envelope and payload may be returned to the earth's surface at a desired time and location. In one embodiment, a cutting mechanism is positioned at or near to the area of the balloon envelope where it is desired to cut a hole in the balloon envelope. It may be desirable to cut the hole at or near to the apex of the balloon envelope, where the lighter-than-air lift gas accumulates and will therefore be vented once the hole is cut.

However, in some applications the hole could be cut at a location in the balloon envelope other than the apex, which may, by design, allow some lift gas to remain within the balloon envelope above the hole, after the hole is cut. Cutting the hole at a location below the apex may therefore slow the descent of the balloon envelope and payload as they return to earth.

In an example embodiment, the cutting mechanism includes a cutting blade that is attached to a rotatable arm. The rotatable arm has a first end that may be attached to a rotatable member, such as a rotary actuator.

During the course of the balloon flight, the rotatable arm can be releasably secured above the top plate, such that a hole will not be cut during flight. When it is desired to cut the hole in the envelope, the rotatable arm can be released such that the cutting blade comes into contact with the membrane of the balloon envelope and punctures the membrane. In particular, when released, the spring-loaded arm rotates and moves the cutting blade such that it cuts a semi-circular path into the membrane. The lift gas within the balloon envelope can then escape upwards through the semi-circular hole created by the cutting blade. In some applications, the cutting blade may cut a shorter path and thus a smaller hole, while in others the cutting blade may cut a longer path and thus a larger hole may be cut. For example, the length of the arc of the circular cutting path may vary.

It has been found that the use of a cutting blade attached to a rotatable arm does not always provide for a complete cutting of the membrane of the balloon envelope. For example, because of oscillations of the cutting blade during the cutting process, the blade may stray up and out of contact with the membrane and not cut through the membrane at all points along the cutting line during the cutting process. As a result, if portions of the membrane remain attached, the amount of lift gas that may be vented may be greatly reduced which may result in the balloon staying aloft longer than intended (causing further balloon travel) and may result in the balloon envelope and payload failing to land at a desired location.

Therefore, it may be desirable to provide an FTS that would help improve the chances of, and hopefully ensure that, the cutting blade remains in contact with the membrane of the balloon envelope during the entire cutting process, such that the blade completely cuts the membrane along the curved cutting path (e.g., without drifting away from the membrane due to, e.g., oscillations during the cutting process and/or other reasons such as a bent top plate or bent rotatable arm).

Accordingly, in an example embodiment, an FTS includes a cutter rail, a modified blade holder, an extended arm that rides under the cutter rail, and a cutting blade. In this embodiment, the cutting blade is secured to a blade block. The second end of the rotatable arm extends all the way through blade block. A semi-circular cutter rail is attached to the top plate along the desired cutting path. During the cutting process, the second end of the rotatable arm rides beneath the cutter rail which does not allow the cutting blade to oscillate or lift up and out of contact with the membrane. Thus, the second end of the rotatable arm is forced downward so that the cutting blade stays down and in contact with the membrane during the cutting process to ensure a complete cut of the membrane.

In addition, to help with proper positioning of the cutting blade on the blade block and on the rotatable arm, a hole is machined through the base of the cutting blade. The second end of the rotatable arm extends through the hole in the cutting blade (and blade block) to provide for the proper positioning of the cutting blade with respect to the blade block and the rotatable arm. The use of a hole located in a specific position in the cutting blade enables balloon assemblers to place the blade in a repeatable and specific location every time during installation (i.e. "not too high, not too low") which greatly increases the ability to repeatably obtain successful cut maneuvers through the membrane during the flight termination. A set screw is used to secure the blade block to the end of the rotatable arm, while two screws are used to secure the cutting blade to the cutting block.

High-altitude balloons may operate in extreme temperature ranges including extremely cold and extremely high temperatures. Further, a limited amount of power is available. Therefore, a mechanism to release the blade block and cutting blade to start the cutting process that may reliably operate in such an environment and under such conditions is desirable.

In an embodiment, the blade block is releasably secured to a squib block attached to the top surface of the top plate. A squib, or pyrotechnic cutting device, is placed inside the squib block adjacent to a bolt that extends through the squib block and is threaded into the blade block to initially secure the blade block to the squib block. Upon activation and explosion of the squib, the bolt that is designed with a weakened section of reduced diameter to ensure reliable separation is caused to be severed, thereby releasing the blade block and cutting blade from the squib block and allowing the cutting blade to begin to rotate. A downwardly extending ramp is positioned at the beginning of the cutter guide. As the rotatable arm begins to rotate, the end of the rotatable arm moves underneath the downwardly extending ramp which forces the end of the rod into position beneath the cutter guide. As the rotatable arm continues to rotate, the end of the rotatable arm remains positioned beneath the cutter guide to ensure that the cutting blade remains in contact with the membrane during the cutting process.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Example Balloon Configuration

Figure 2:
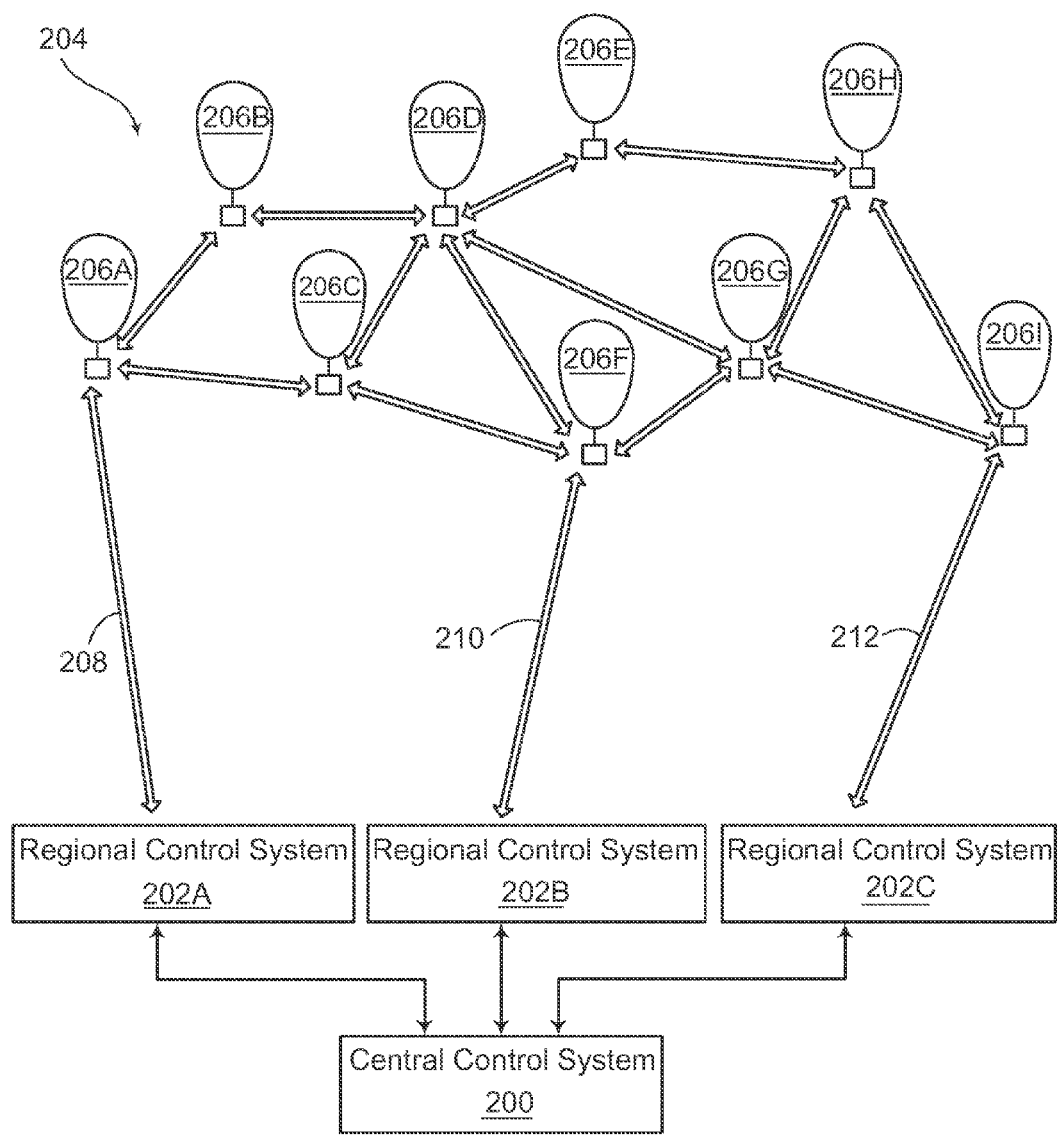
FIG. 2 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 2 shows a high-altitude balloon 200, according to an example embodiment. As shown, the balloon 200 includes an envelope 202, a skirt 204, a payload 206, and a cut-down system 208, which is attached between the balloon 202 and payload 204.

The envelope 202 and skirt 204 may take various forms, which may be currently well-known or yet to be developed. For instance, the envelope 202 and/or skirt 204 may be made of materials including metalized Mylar or BoPet. Additionally or alternatively, some or all of the envelope 202 and/or skirt 204 may be constructed from a highly-flexible latex material or a rubber material such as chloroprene. Other materials are also possible. Further, the shape and size of the envelope 202 and skirt 204 may vary depending upon the particular implementation. Additionally, the envelope 202 may be filled with various different types of gases, such as helium and/or hydrogen. Other types of gases are possible as well.

The payload 206 of balloon 200 may include a processor 212 and on-board data storage, such as memory 214. The memory 214 may take the form of or include a non-transitory computer-readable medium. The non-transitory computer-readable medium may have instructions stored thereon, which can be accessed and executed by the processor 212 in order to carry out the balloon functions described herein. Thus, processor 212, in conjunction with instructions stored in memory 214, and/or other components, may function as a controller of balloon 200.

The payload 206 of balloon 200 may also include various other types of equipment and systems to provide a number of different functions. For example, payload 206 may include an optical communication system 216, which may transmit optical signals via an ultra-bright LED system 220, and which may receive optical signals via an optical-communication receiver 222 (e.g., a photodiode receiver system). Further, payload 206 may include an RF communication system 218, which may transmit and/or receive RF communications via an antenna system 240.

The payload 206 may also include a power supply 226 to supply power to the various components of balloon 200. The power supply 226 could include a rechargeable battery. In other embodiments, the power supply 226 may additionally or alternatively represent other means known in the art for producing power. In addition, the balloon 200 may include a solar power generation system 227. The solar power generation system 227 may include solar panels and could be used to generate power that charges and/or is distributed by the power supply 226.

The payload 206 may additionally include a positioning system 224. The positioning system 224 could include, for example, a global positioning system (GPS), an inertial navigation system, and/or a star-tracking system. The positioning system 224 may additionally or alternatively include various motion sensors (e.g., accelerometers, magnetometers, gyroscopes, and/or compasses).

The positioning system 224 may additionally or alternatively include one or more video and/or still cameras, and/or various sensors for capturing environmental data.

Some or all of the components and systems within payload 206 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 200 includes an ultra-bright LED system 220 for free-space optical communication with other balloons. As such, optical communication system 216 may be configured to transmit a free-space optical signal by modulating the ultra-bright LED system 220. The optical communication system 216 may be implemented with mechanical systems and/or with hardware, firmware, and/or software. Generally, the manner in which an optical communication system is implemented may vary, depending upon the particular application. The optical communication system 216 and other associated components are described in further detail below.

In a further aspect, balloon 200 may be configured for altitude control. For instance, balloon 200 may include a variable buoyancy system, which is configured to change the altitude of the balloon 200 by adjusting the volume and/or density of the gas in the balloon 200. A variable buoyancy system may take various forms, and may generally be any system that can change the volume and/or density of gas in the envelope 202.

In an example embodiment, a variable buoyancy system may include a bladder 210 that is located inside of envelope 202. The bladder 210 could be an elastic chamber configured to hold liquid and/or gas. Alternatively, the bladder 210 need not be inside the envelope 202. For instance, the bladder 210 could be a rigid bladder that could be pressurized well beyond neutral pressure. The buoyancy of the balloon 200 may therefore be adjusted by changing the density and/or volume of the gas in bladder 210. To change the density in bladder 210, balloon 200 may be configured with systems and/or mechanisms for heating and/or cooling the gas in bladder 210. Further, to change the volume, balloon 200 may include pumps or other features for adding gas to and/or removing gas from bladder 210. Additionally or alternatively, to change the volume of bladder 210, balloon 200 may include release valves or other features that are controllable to allow gas to escape from bladder 210. Multiple bladders 210 could be implemented within the scope of this disclosure. For instance, multiple bladders could be used to improve balloon stability.

In an example embodiment, the envelope 202 could be filled with helium, hydrogen or other lighter-than-air material. The envelope 202 could thus have an associated upward buoyancy force. In such an embodiment, air in the bladder 210 could be considered a ballast tank that may have an associated downward ballast force. In another example embodiment, the amount of air in the bladder 210 could be changed by pumping air (e.g., with an air compressor) into and out of the bladder 210. By adjusting the amount of air in the bladder 210, the ballast force may be controlled. In some embodiments, the ballast force may be used, in part, to counteract the buoyancy force and/or to provide altitude stability.

In other embodiments, the envelope 202 could be substantially rigid and include an enclosed volume. Air could be evacuated from envelope 202 while the enclosed volume is substantially maintained. In other words, at least a partial vacuum could be created and maintained within the enclosed volume. Thus, the envelope 202 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 202 could be a first color (e.g., black) and/or a first material from the rest of envelope 202, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 202 as well as the gas inside the envelope 202. In this way, the buoyancy force of the envelope 202 may increase. By rotating the balloon such that the second material is facing the sun, the temperature of gas inside the envelope 202 may decrease. Accordingly, the buoyancy force may decrease. In this manner, the buoyancy force of the balloon could be adjusted by changing the temperature/volume of gas inside the envelope 202 using solar energy. In such embodiments, it is possible that a bladder 210 may not be a necessary element of balloon 200. Thus, in various contemplated embodiments, altitude control of balloon 200 could be achieved, at least in part, by adjusting the rotation of the balloon with respect to the sun.

Further, a balloon 206 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 200 also includes a cut-down system 208. The cut-down system 208 may be activated to separate the payload 206 from the rest of balloon 200. The cut-down system 208 could include at least a connector, such as a balloon cord, connecting the payload 206 to the envelope 202 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 206 away from the envelope 202.

The cut-down functionality may be utilized anytime the payload needs to be accessed on the ground, such as when it is time to remove balloon 200 from a balloon network, when maintenance is due on systems within payload 206, and/or when power supply 226 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

Figure 3:
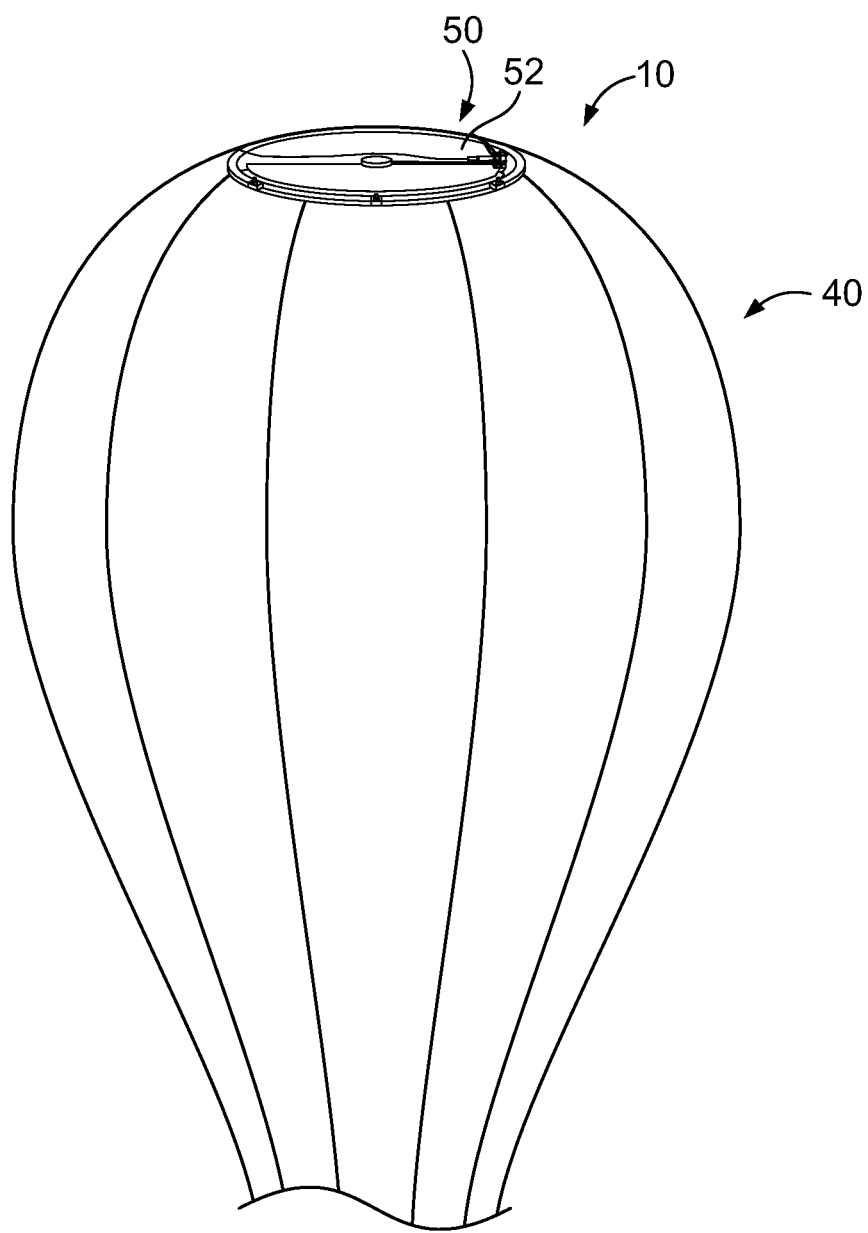
FIG. 3 shows a perspective view of a balloon 10 having balloon envelope 40 and flight termination system 50, according to an example embodiment.

3. Example of a Cutting Mechanism used to Reliably Cut a Hole into the Balloon Envelope to Vent Lift Gas As disclosed in FIGS. 3-12, the present embodiments provide a reliable mechanism for insuring that a hole is properly cut into the balloon envelope to allow for the proper venting of lift gas from the balloon envelope through the hole, such that the balloon envelope and payload may be returned to the earth's surface at a desired time and location. As shown in FIG. 3, a balloon 10 is shown having a cutting mechanism 50 positioned on plate 52 about an area of the balloon envelope 40 where it is desired to cut a hole into the balloon envelope 40 at an appropriate time. In this example, the cutting mechanism 50 is positioned at the apex of the balloon 10 where the lift gas is accumulated, although in other embodiments it could be located elsewhere on the balloon envelope 40, in a location other than the apex, to allow some lift gas to remain within the balloon envelope 40 as a way to slow the descent of the balloon envelope and payload as they return to earth.

In an example embodiment, and shown with reference to FIGS. 4A-4D showing a top view of the varying stages of the cutting process, the cutting mechanism 50 is positioned on plate 52 that is secured to the apex of balloon envelope 40. The plate 52 is secured to the balloon envelope 40 using circular member 60 with screws 62 extending through flanges 74 positioned on circular member 60. The plate 52 has an opening that exposes a portion 54 of balloon envelope 40. A cutting blade 93 (shown in FIGS. 5A and 5B) is attached to a rotatable arm 84. The rotatable arm 84 has a first end that is mounted to a rotatable member 83 that is attached to the top plate 52 positioned at the apex of the balloon envelope 40 in this example.

Figure 4A:
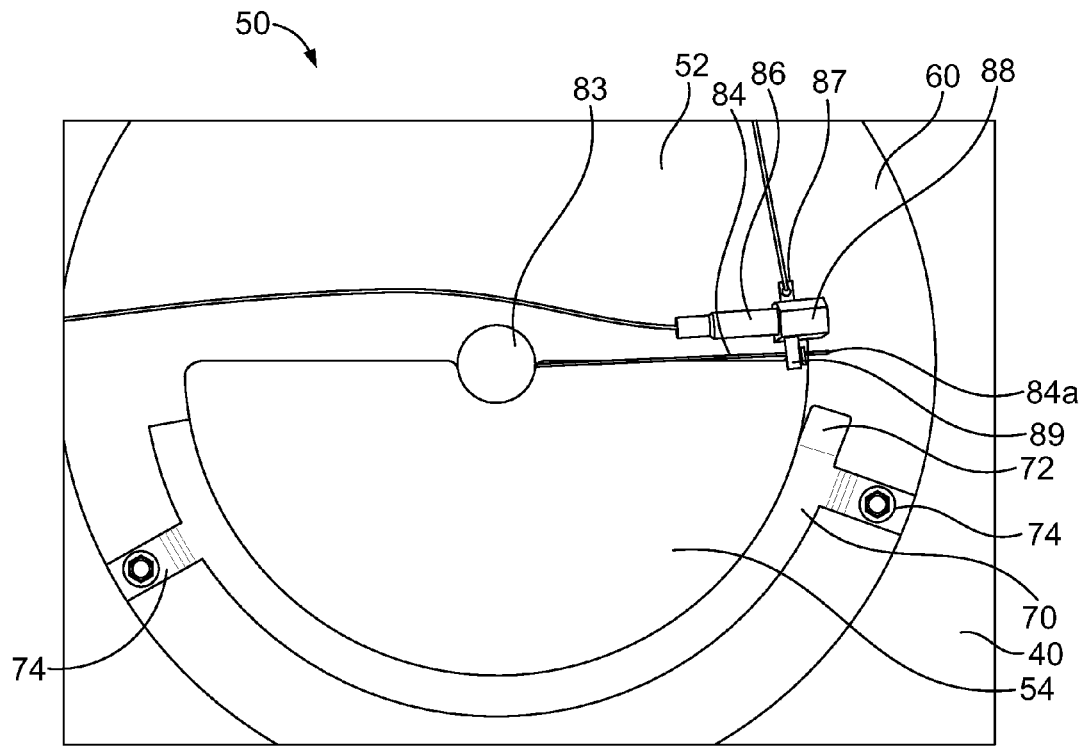
FIG. 4A shows a top view of the flight termination apparatus 50 shown in FIG. 3, before the blade block 89 is released from release member 88.

During the course of the balloon flight the rotatable arm 84 is preferably releasably secured above the top plate 52. In particular, as shown in FIG. 4A, the rotatable arm extends through a blade block 89 to which cutting blade 93 (shown in FIGS. 5A and 5B) is secured. The blade block is secured to a release member 88 that is attached to top plate 52 using a bolt 87 that extends through the release member and is threadingly engaged within the blade block 89. At this point the blade block (and cutting blade) is positioned above the top plate 52. A second end 84a of the rotatable arm 84 is positioned adjacent downwardly extending entrance ramp 72 positioned on cutter guide rail 70.

When it is desired to cut a hole into the balloon envelope 40 to vent the lift gas contained therein, a squib member 86 that extends into the release member 88 is caused to explode which severs the bolt 87, thereby releasing the blade block 89 from the release member 88 thereby releasing the rotatable arm 84 and cutting blade 93 (shown in FIGS. 5A and 5B) that are secured to the blade block 89 from the release member 88. After their release from the release member 88, the rotatable arm 84, blade block 89, and cutting blade 93 (shown in FIGS. 5A and 5B) rotate towards the cutter guide rail 70. The second end 84a of the rotatable arm 84 rotates and extends beneath the downwardly extending entrance ramp 72 of cutter guide rail 70.

Figure 4B:
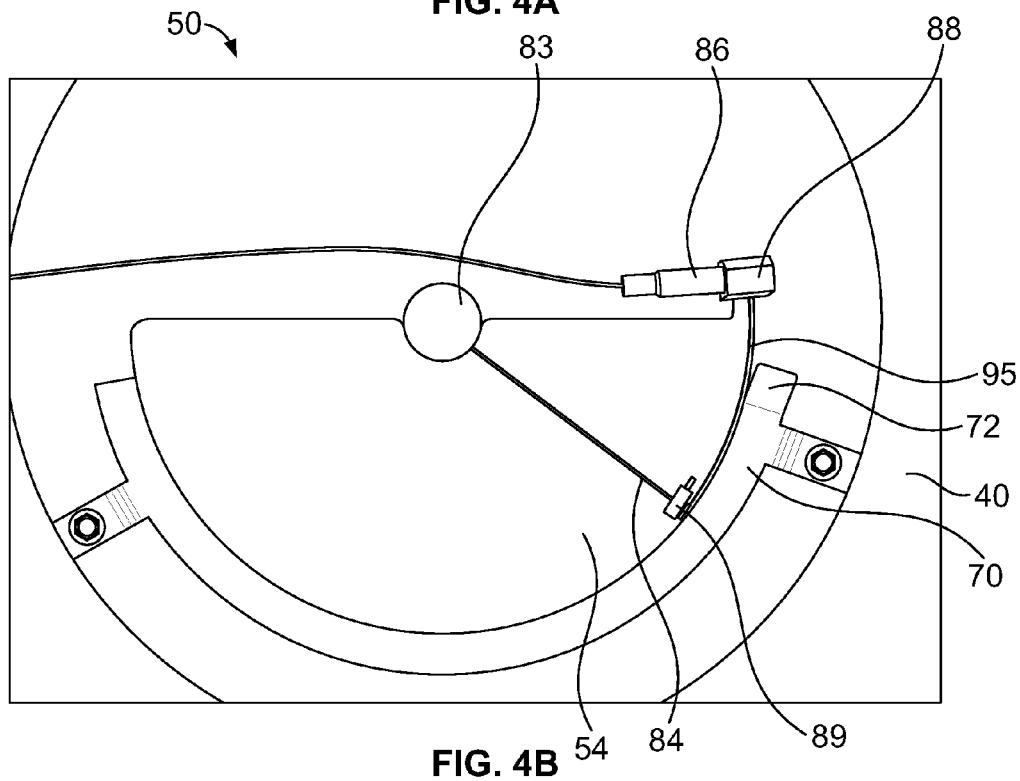
FIG. 4B shows a top view of the flight termination apparatus 50 shown in FIG. 3, after the blade block 89 has been released from release member 88 and partially rotated adjacent cutter guide rail 70.

In FIG. 4B, the rotatable arm 84, blade block 89, and cutting blade 93 (shown in FIGS. 5A and 5B) are shown shortly after release from the release member 86 and after they have rotated over balloon membrane 54. At this point, the end 84a of the rotatable arm 84 is guided beneath the cutter guide rail 70 to force the cutting blade into contact with the membrane 54 of the balloon envelope 40, where an arc of a circular cutting path 95 is cut into the membrane 54.

Figure 4C:
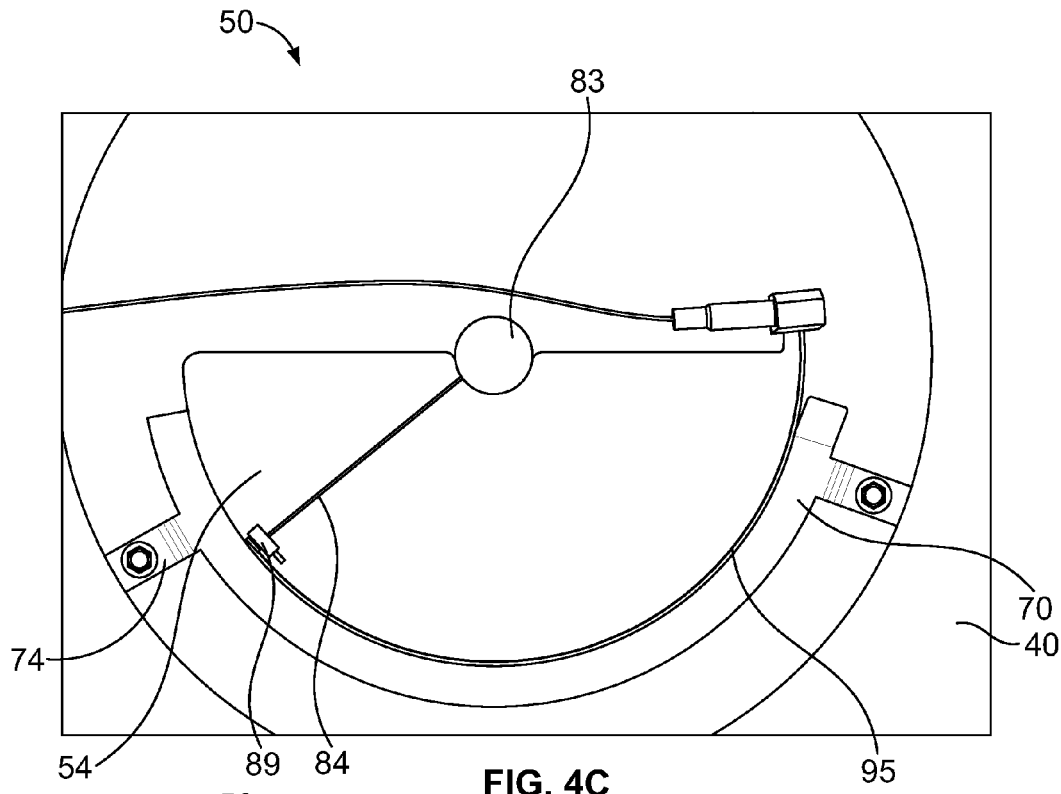
FIG. 4C shows a top view of the flight termination apparatus 50 shown in FIGS. 4A-4B, after the blade block 89 has further rotated.

In FIG. 4C, the rotatable arm 84, blade block 89, and cutting blade 93 (shown in FIGS. 5A and 5B) are shown a short time after the position shown in FIG. 4B after they have rotated further over balloon membrane 54. At this point, the end 84a of the rotatable arm 84 is still guided beneath the cutter guide rail 70 to force the cutting blade into contact with the membrane 54 of the balloon envelope 40, where the arc of a circular cutting path 95 is further cut into the membrane 54.

Figure 4D:
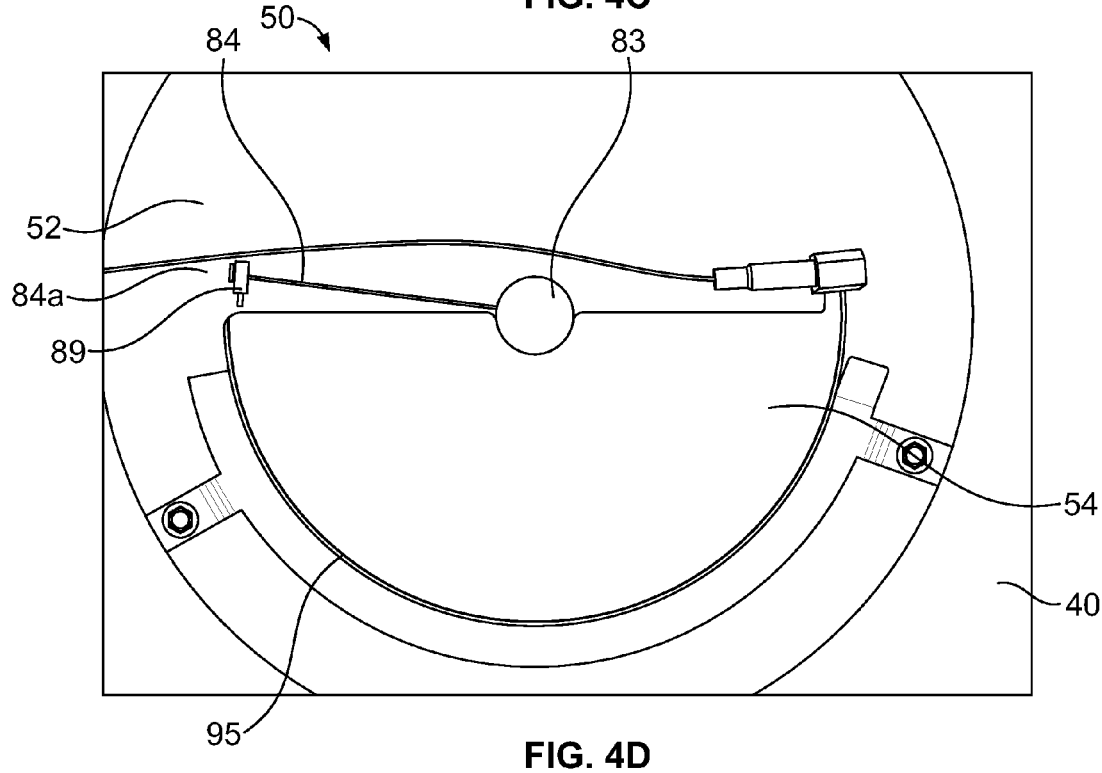
FIG. 4D shows a top view of the flight termination apparatus 50 shown in FIGS. 4A-4C after blade block 89 has further rotated.

FIG. 4D shows the rotatable arm 84, blade block 89, and cutting blade 93 (shown in FIGS. 5A and 5B) after the arc of circular cutting path 95 has been completed. At this point, the end 84a of rotatable arm 84, blade block 89, and cutting blade 93 have extended beyond cutter guide rail 70 and are again positioned above plate 52, having traveled in a semi-circle.

A hole is formed by the semi-circular cutting path 95 cut into the balloon membrane 54. The lift gas within the balloon envelope 40 is then vented through the semi-circular hole created by the cutting blade. In some applications, the cutting blade may cut a smaller hole, while in others a larger hole may be cut. For example, the length of the arc of the circular cutting path may vary.

Figure 5A:
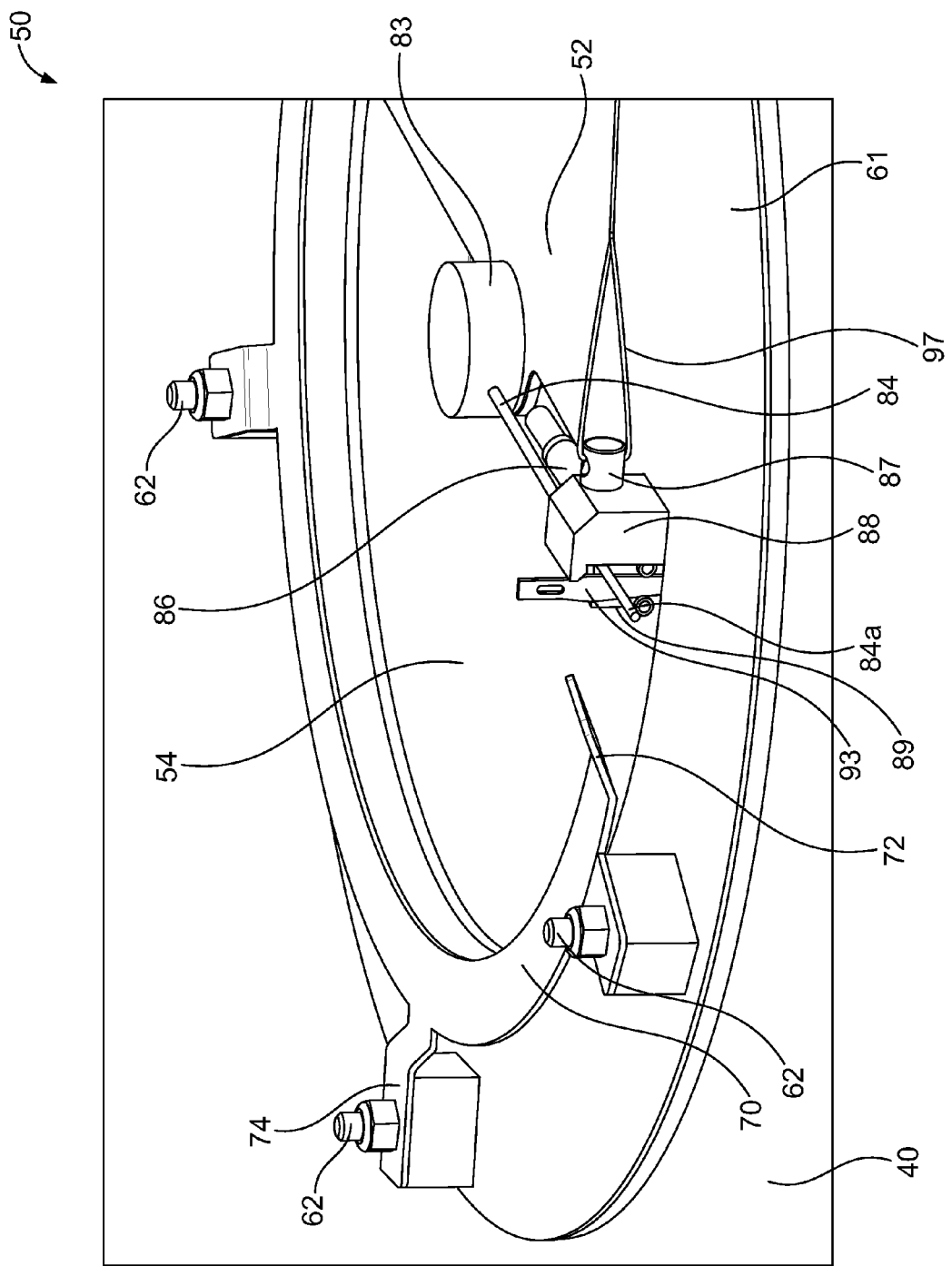
FIG. 5A shows a perspective view of the flight termination apparatus 50 shown in FIG. 4A, before the blade block 89 is released from release member 88.
Figure 5B:
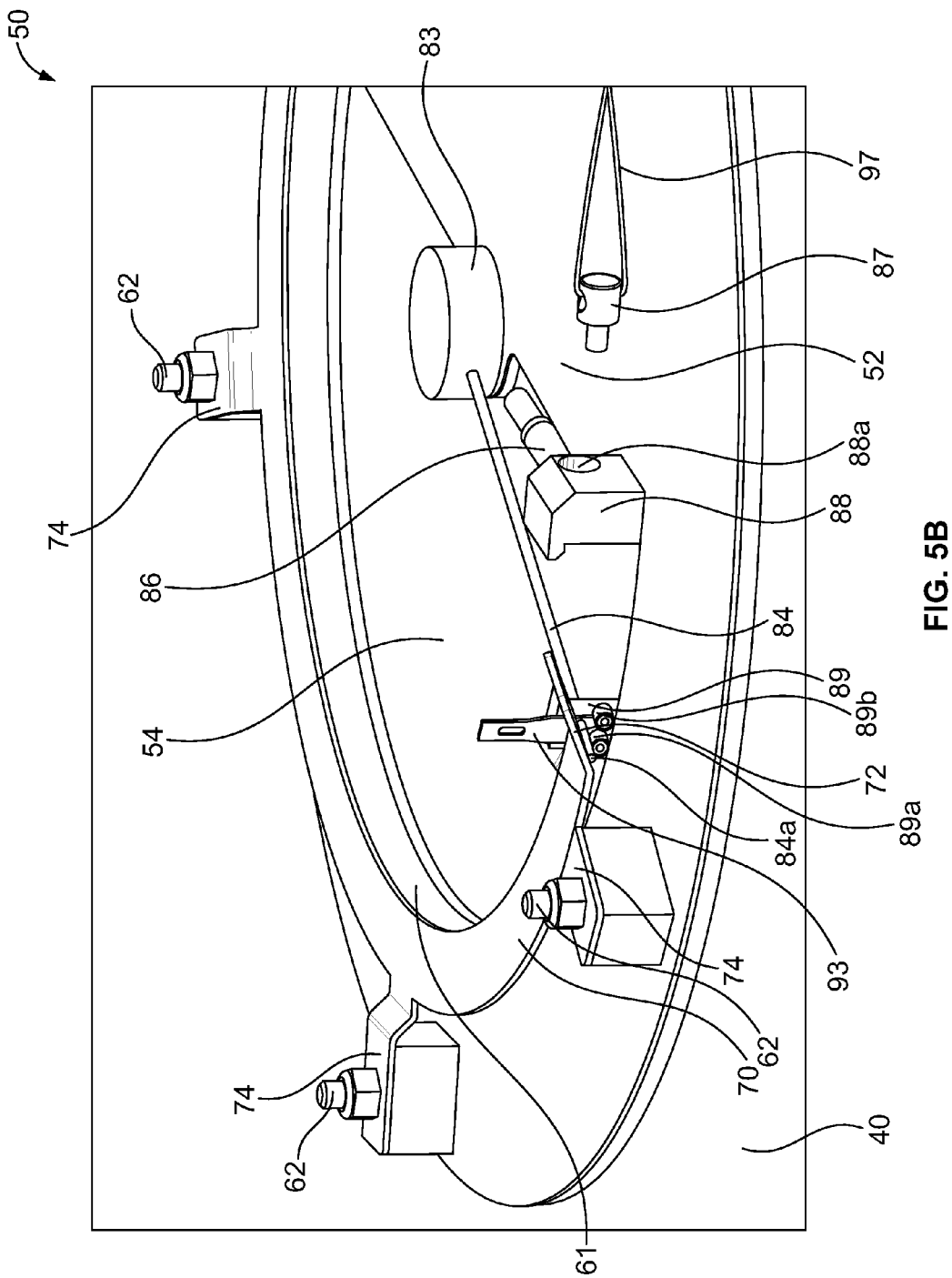
FIG. 5B shows a perspective view of the flight termination apparatus 50 shown in FIG. 3A, after the blade block 89 has been released from release member 88 and partially rotated adjacent cutter guide rail 70.

FIGS. 5A and 5B show a partial perspective view of the cutting mechanism 50. In FIG. 5A, the cutting mechanism 50 is positioned on plate 52 that is secured to the apex of balloon envelope 40. The cutter guide rail 70 is secured to the balloon envelope 40 using bolts 62 that extend through flanges 74 positioned on cutter guide rail 70. The plate 52 has an opening that exposes a portion 54 of balloon envelope 40. A cutting blade 93 is attached to rotatable arm 84. The rotatable arm 84 has a first end that is mounted to a rotatable member 83 that is positioned on the top plate 52 at the apex of the balloon envelope 40 in this example.

During the course of the balloon flight the rotatable arm 84 is preferably releasably secured above the top plate 52. In particular, as shown in FIG. 5A, the rotatable arm 84 extends through blade block 89, and an end 84a extends through the blade block and cutting blade 93. The cutting blade 93 is secured to the blade block 89 using a pair of screws 89a and 89b. At this point, the cutting block 93 and rotatable arm 84 are secured to the release member 88 that is attached to top plate 52 using a bolt 87 that extends through the release member 88 and is threadingly engaged within the blade block 89. At this point the cutting blade 93 is positioned above the top plate 52. The second end 84a of the rotatable arm 84 is positioned adjacent downwardly extending entrance ramp 74 positioned on cutter guide rail 70.

When it is desired to cut a hole into the balloon envelope 40 to vent the lift gas contained therein, a squib member 86 that extends into the release member 88 is caused to explode which severs the bolt 87, thereby releasing the blade block 89 from the release member 88 thereby also releasing the rotatable arm 84 and cutting blade 93 that are secured to the blade block 89 from the release member 88. A tether 97 is used to secure the top of bolt 87 after it has been severed to prevent it from dropping to the earth, providing for additional safety.

FIG. 5B shows the cutting mechanism 50 after the release of the rotatable arm 84, blade block 90, and cutting blade 93 from release member 88. Tether 97 secures the end of severed bolt 87. In FIG. 5B, the rotatable arm 84, blade block 89, and cutting blade 93 have been rotated towards the cutter guide rail 70. At this point, the second end 84a of the rotatable arm 84 has rotated beneath downwardly extending entrance ramp 72 of cutter guide rail 70.

As noted above, the use of a cutting blade attached to a rotatable arm does not always provide for a complete cutting of the membrane of the balloon envelope. For example, because of oscillations of the cutting blade during the cutting process, the blade may stray up and out of contact with the membrane and not cut through the membrane at all points along the cutting line during the cutting process. As a result, if portions of the membrane remain attached, the amount of lift gas that may be vented may be greatly reduced which may result in the balloon staying aloft longer than intended (causing further balloon travel) and may result in the balloon envelope and payload failing to land at a desired location.

The cutting mechanism 50 provides an improved design that includes cutter guide rail 70 that forces the second end 84a of rotatable arm 84 and the cutting blade 93 into contact with the balloon membrane 54 that ensures that the cutting blade 93 remains in contact with the membrane 54 of the balloon envelope 40 during the cutting process to make a complete cut of the membrane 54 along the arc of the circular cutting path 95 (shown in FIGS. 4A-4D) that prevents that cutting blade from drifting away from the membrane during the cutting process. In addition, an adhesive may be used so that the balloon membrane 54 is positioned tightly against the underside of circular member 61 during the cutting process.

Figure 6:
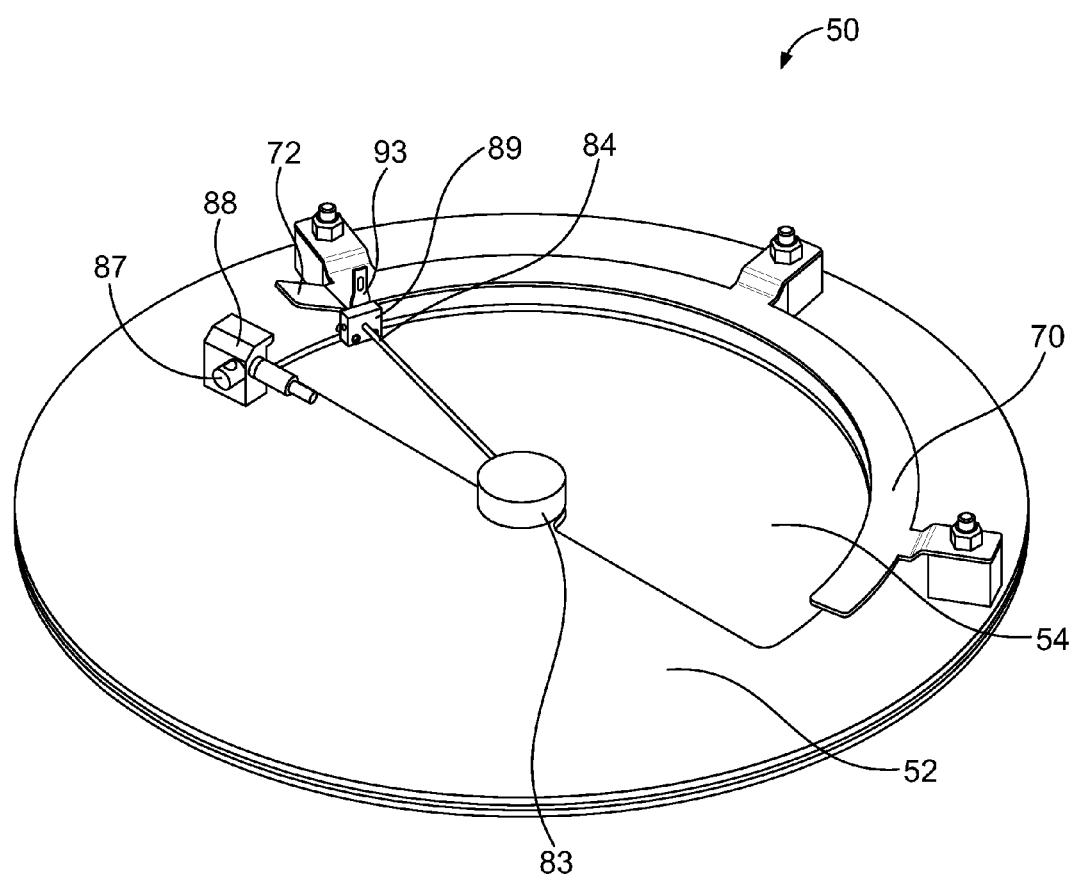
FIG. 6 shows a perspective view of the flight termination apparatus 50 shown in FIG. 5B.

FIG. 6 is a perspective view of the cutting mechanism 50. The present embodiments provide an improved flight termination system (FTS) using a cutting mechanism 50 that includes a cutter guide rail 70, a blade block 89 having a hole extending therethrough to allow end 84a of rotatable arm 84 to extend through the blade block, wherein the end 84a of rotatable arm 84 rides under the cutter guide rail 70. The cutter guide rail 70 is secured in place above plate 52. The rotatable arm 84 is secured to rotatable member 83. The cutting blade 93 is initially releasably secured to release member 88 using a severable bolt 87 that extends through the release member 88 and threadingly engages blade block 89. During the cutting process, the second end 84a of the rotatable arm 84 rides beneath the cutter guide rail 70 which does not allow the cutting blade to oscillate or lift up and out of contact with the membrane 54. Thus, the second end 84a of the rotatable arm 84 is forced downward by the cutter guide rail 70 so that the cutting blade 93 stays down and in contact with the membrane 54 during the cutting process to ensure a complete cut of the membrane 54.

Figure 7:
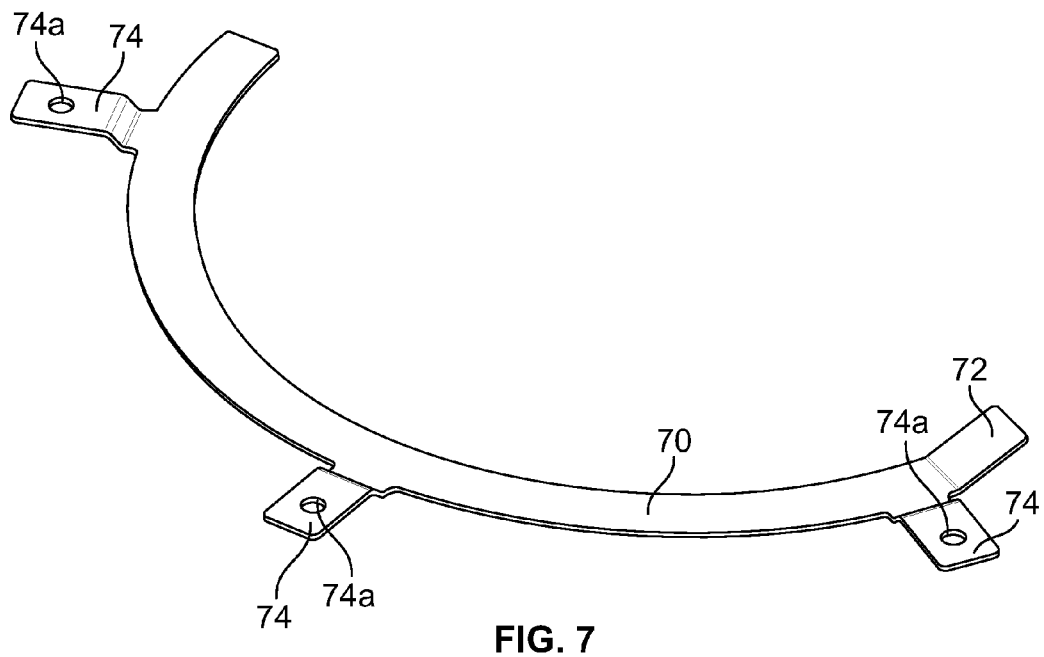
FIG. 7 is a perspective view of cutter guide rail 70 shown in FIGS. 4A-6.

FIG. 7 shows a perspective view of cutter guide rail 70. Downwardly extending entrance ramp 72 serves to guide the end of the rotatable arm down and beneath the cutter guide rail 70. The cutter guide rail 70 is secured to plate 52 with flanges 74 that include throughholes 74a to allow for a bolt to extend through the flanges to secure the cutter guide rail to plate 52.

Figure 8:
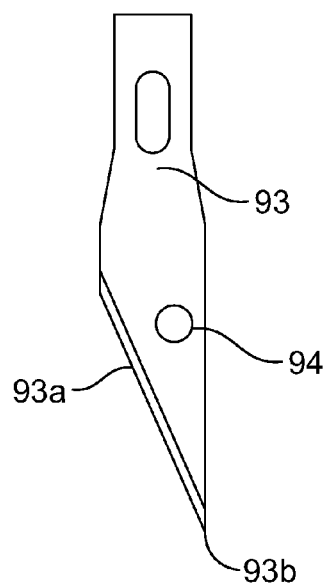
FIG. 8 is a side view of cutting blade 93.

FIG. 8 is a side view of cutting blade 93, which includes cutting edge 93a and cutting tip 93b. To help ensure that the cutting blade 93 is properly positioned on the blade block 89 and on the rotatable arm 84, a precisely located hole 94 is machined through the base of the cutting blade 93. As shown in FIGS. 5A and 5B, the second end 84a of the rotatable arm 84 extends through the hole 94 in the cutting blade 93 to provide for the proper positioning of the cutting blade with respect to the blade block and the rotatable arm. The use of a precisely located hole 94 in the cutting blade 93 enables balloon assemblers to place the blade in a repeatable and specific location every time during installation (i.e. "not too high, not too low") which greatly increases the ability to repeatably obtain successful cut maneuvers through the membrane 54 during the flight termination.

Figure 9:
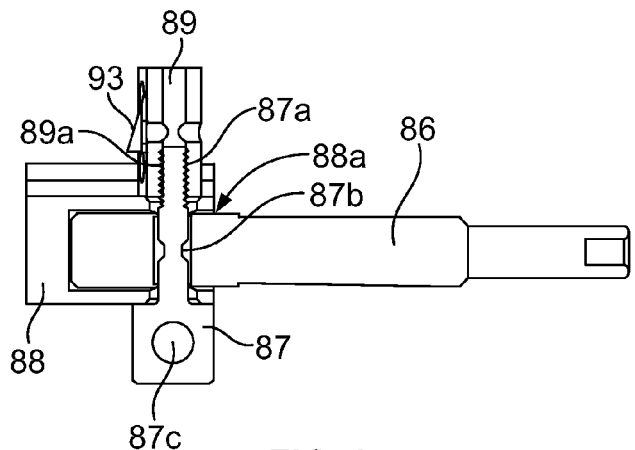
FIG. 9 is a cross-sectional view of the blade block 89 secured to release member 88 with bolt 87.

High-altitude balloons may operate in extreme temperature ranges including extremely cold and extremely high temperatures. Further, a limited amount of power is available. Therefore, a mechanism to release the blade block 89 and cutting blade 93 to start the cutting process that may reliably operate in such an environment and under such conditions is desirable. In FIG. 9, an embodiment showing a cross sectional view of a release mechanism is shown. In particular, blade block 89 is releasably secured to a squib block or release member 88 attached to the top surface of the top plate. A squib, or pyrotechnic cutting device, is placed inside the squib block 88 adjacent to a bolt 87 that extends through the squib block 87 and includes threads 87a that are threaded into corresponding threads 89a in the blade block 89 to initially secure the blade block 89 to the squib block 88. Upon activation and explosion of the squib, the bolt 87 is caused to be severed at a narrowed section 87b, thereby releasing the blade block 89 and cutting blade 93 from the squib block 88 and allowing the cutting blade 93 (attached to the rotatable arm shown in FIGS. 5A and 5B) to begin to rotate.

Other means for releasing the blade block 89 could also be used instead of a squib. For example, an actuated trigger mechanism having opposed pivotable jaws could be used to hold the blade block in place. Upon activation, the jaws could be opened, thereby releasing the blade block (and cutting blade). Other devices such as a linear actuator, or rotary actuator could also be used to releasably secure the blade block prior to the cutting process.

Figure 10:
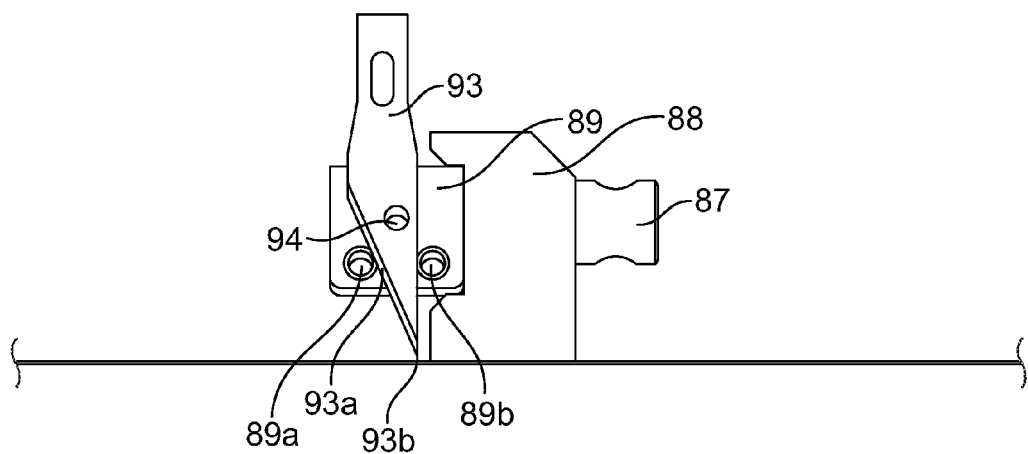
FIG. 10 is a side view of the cutting blade 93 secured to blade block 89.
Figure 11:
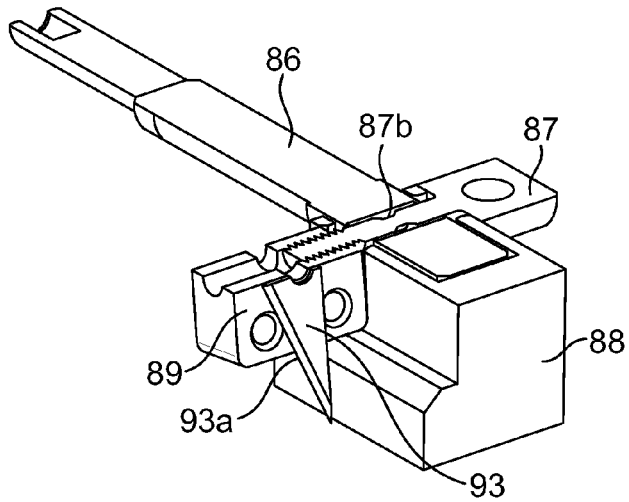
FIG. 11 is a perspective cross-sectional view of the blade block 89 secured to release member 88 with bolt 87.

FIG. 10 shows a side view of the blade block 89 and cutting blade 93 releasably secured to release member 88 with severable bolt 87. FIG. 11 shows a cross sectional perspective view of the blade block 89, release member 88, and cutting blade 93 shown in FIG. 10. The cutting blade 93 is secured to the blade block 89 using screws 89a and 89b. A precisely located hole 94 is positioned in the cutting blade to properly position the cutting tip 93a with respect to the blade block 89. A bolt 87 extends through and aperture in the release member 88 and has a narrowed portion 87b that is positioned adjacent squib member 86. Upon activation and explosion of the squib member 86, the bolt 87 is severed at narrowed portion 87b, releasing blade block 89 and cutting blade 93 from release member 88.

4. Example Method of Cutting a Hole in a Balloon Envelope

Figure 12:
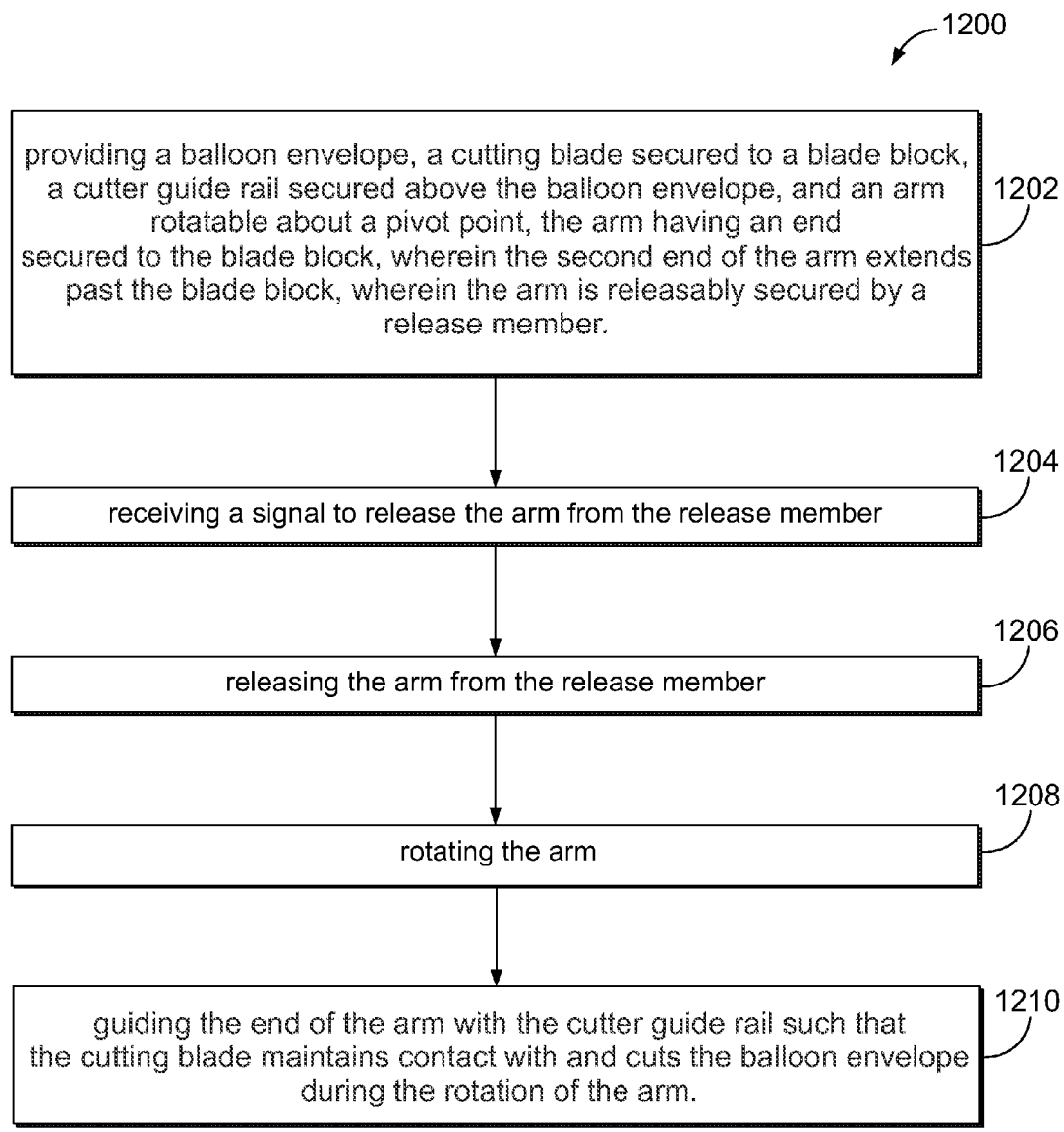
FIG. 12 is a method, according to an example embodiment.

FIG. 12 shows a method 1200 that may be used for cutting a hole in a balloon envelope using the cutting mechanism 50 shown in FIGS. 3-6. Method 1200 is provided that includes the step 1202 of providing a balloon envelope, a cutting blade secured to a blade block, a cutter guide rail secured above the balloon envelope, and an arm rotatable about a pivot point, the arm having an end secured to the blade block, wherein the second end of the arm extends past the blade block, wherein the arm is releasably secured by a release member.

Method 1200 further includes the step 1204 of receiving a signal to release the arm from the release member, the step 1206 of releasing the arm from the release member, and the step 1208 of rotating the arm. Method 1200 further includes the step 1210 of guiding the end of the arm with the cutter guide rail such that the cutting blade maintains contact with and cuts the balloon envelope during the rotation of the arm.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
a balloon envelope;
a cutting blade secured to a blade block;
a cutter guide rail secured above the balloon envelope; and
an arm having a first end and a second end, the arm rotatable about a pivot point, the arm secured to the blade block, wherein the second end of the arm extends past the blade block, wherein the arm is releasably secured by a release member, and wherein release of the arm from the release member allows for a rotation of the arm, wherein the rotation of the second end of the arm is guided by the cutter guide rail such that the cutting blade maintains contact with and cuts the balloon envelope during the rotation of the arm.

2. The apparatus of claim 1, wherein the second end of the arm extends through a hole in the cutting blade.

3. The apparatus of claim 1, wherein the cutter guide rail extends in a semi-circle.

4. The apparatus of claim 1, wherein the cutter guide rail includes a downwardly extending entrance ramp.

5. The apparatus of claim 1, wherein a portion of the balloon envelope adjacent a cutting line of the cutting blade is adhered to a bottom of a plate.

6. The apparatus of claim 1, wherein the arm is releasably secured to the release member by having the blade block releasably secured to the release member.

7. The apparatus of claim 6, wherein the blade block is releasably secured to the release member by a bolt extending through the release member and extending into the blade block.

8. The apparatus of claim 7, wherein the bolt is threaded into the blade block.

9. The apparatus of claim 7, wherein a squib is positioned within the release member adjacent the bolt.

10. The apparatus of claim 9, wherein the bolt is severed when the squib is exploded, and the blade block is released from the release member allowing the arm to rotate.

11. The apparatus of claim 1, further including means for releasing the arm from the release member.

12. The apparatus of claim 1, wherein the arm is releasably secured to the release member by an actuated trigger mechanism.

13. The apparatus of claim 9, wherein the bolt has a reduced diameter section adjacent the bolt.

14. The apparatus of claim 1, wherein a rotary actuator is used to rotate the arm.

15. A method of cutting a balloon envelope to release lift gas from the envelope, comprising the steps of:
providing a balloon envelope, a cutting blade secured to a blade block, a cutter guide rail secured above the balloon envelope, and an arm having a first end and a second end, the arm rotatable about a pivot point, the arm secured to the blade block, wherein the second end of the arm extends past the blade block, wherein the arm is releasably secured by a release member;
receiving a signal to release the arm from the release member;
releasing the arm from the release member;
rotating the arm; and
guiding the second end of the arm with the cutter guide rail such that the cutting blade maintains contact with and cuts the balloon envelope during the rotation of the arm.

16. The method of claim 15, wherein the arm is releasably secured to the release member by a bolt extending through the release member into the blade block.

17. The method of claim 16, wherein the step of releasing the arm from the release member includes exploding a squib positioned in the release member adjacent to the bolt extending through the release member causing the bolt to sever, thereby releasing the arm from the release member.

* * * * *